United States Patent [19]

Cornelissen

[11] Patent Number: 4,962,471
[45] Date of Patent: Oct. 9, 1990

[54] HIGH SPEED DIGITAL CARRY LOOK AHEAD CIRCUIT FOR PARALLEL ADDER

[75] Inventor: Bernardus H. J. Cornelissen, Bergeijk, Netherlands

[73] Assignee: U.S. Philips Corporation, New York, N.Y.

[21] Appl. No.: 260,155

[22] Filed: Oct. 20, 1988

[30] Foreign Application Priority Data

Nov. 2, 1987 [GB] United Kingdom ............... 8725625

[51] Int. Cl.$^5$ .............................................. G06F 7/42
[52] U.S. Cl. .................................................. 364/787
[58] Field of Search ............... 364/784, 786, 787, 768

[56] References Cited

U.S. PATENT DOCUMENTS

| | | | |
|---|---|---|---|
| 4,563,751 | 1/1986 | Barker | 364/786 |
| 4,667,303 | 5/1978 | Pfennings | 364/784 |
| 4,740,907 | 4/1988 | Shimizu et al. | 364/784 |
| 4,807,176 | 2/1989 | Yamada et al. | 364/786 |

OTHER PUBLICATIONS

Weste et al., *Principles of CMOS VLSI Design, A Systems Perspective*, Addison-Wesley Pub. Co., pp. 169–171.

Kiburn et al., "A Parallel Arithmetic Unit Using a Saturated-Transistor Fast-Carry Circuit", Inst of Electrical Engineers, Paper #3302M pp. 573–584, Nov. 1960.

*Primary Examiner*—Dale M. Shaw
*Attorney, Agent, or Firm*—Bernard Franzblau

[57] ABSTRACT

A digital IC carry look ahead circuit consists of a carry transfer stage (12) and a logic network (10). The carry transfer stage transfers the carry from a preceding stage to a next following stage unless altered by its associated logic network which provides symmetrical outputs. The logic network comprises two or more half adders connected sequentially between a common node (38) in the carry transfer state and a voltage supply line (50). Each half adder includes first, second and third active switching devices ($K_i$, $G_i$ and $P_i$). The third active switching device ($P_i$) are connected in series between the common node (38) and the voltage supply line (50). The first and second active switching device ($K_i$, $G_i$) of each half adder are connected in series and with a common junction thereof connected to a common junction of its associated third active device and the next following third active device or the connection to the voltage supply line (50). Corresponding free terminals of the first and second switching devices constitute symmetrical outputs of the logic network. The first switching devices are activated in response to $A_i*B_i=1$ where $A_i$ and $B_i$ are bits of corresponding significance of two numbers added. The second switching devices are activated in response to $\overline{A_i+B_i}=1$ and the third switching devices are activated in response to $A_i \oplus B_i=1$.

10 Claims, 4 Drawing Sheets

HIGH SPEED DIGITAL CARRY LOOK AHEAD CIRCUIT FOR PARALLEL ADDER

BACKGROUND OF THE INVENTION

The present invention relates to a digital integrated circuit particularly but not exclusively, to a carry look ahead circuit for use in adder circuits.

A parallel arithmetic unit, generally known in the art as a Manchester chain, is disclosed in a Paper No 3302M entitled "A parallel arithmetic unit using a saturated-transistor fast-carry circuit" by T. Kilbuzn, D.B.G. Edwards and D. Aspinall read before the Institute of Electrical Engineers 1st March 1960 and published November 1960 at pages 573 to 584. The Manchester chain is a well known parallel adder in which the addition of two numbers is carried out bit-by-bit in a number of parallel stages When adding these numbers stage by stage a carry when generated, has to be relayed to the next stage of higher significance and included in the addition operation. A drawback of this type of parallel adder is that it is relatively slow due to the rippling of the carry signal, the signal processing time being proportional to the square of the number of stages. Additionally the carry output from the Manchester chain is non-symmetrical so that if symmetrical carry signals are required, a second, complementary adder is required.

Pages 169 to 171 of "Principles of CMOS VLSI Design - A System Perspective" by N H.E. Weste and K Eshraghian, published by Addison - Wesley publishing Company disclose a cascade voltage switch logic (CVSL). CVSL is a differential style of logic requiring symmetrical signals, that is both true and complement signals, to be routed to gates. In order to be able to produce these signals simultaneously, two complementary NMOS switch structures are provided and connected to a pair of cross-coupled PMOS pull-up transistors. Positive feedback is applied to the PMOS pull-ups to cause the gates to switch.

Modifying CVSL by having cascoded cross-coupled NMOS - PMOS loads instead of the cross-coupled PMOS pull-up transistors, and connecting the gates of the NMOS devices to a reference voltage produces a different electrical behavior which results in much faster switching times This modified logic having the cascoded cross-coupled NMOS-PMOS loads will be referred to as differential split level (DSL) logic.

Duplicating the switch structures in order to provide true and complement signals has the disadvantage that when integrating the circuits, a relatively large chip area is required for each logic stage because of having to provide dual circuits If chip area can be saved then this will enable more logic stages to be provided in a chip.

SUMMARY OF THE INVENTION

An object of the invention is to simplify the construction of, and to increase the speed of, digital integrated circuits.

According to one aspect of the present invention there is provided a carry look ahead circuit comprising a carry transfer stage and a logic network having symmetrical outputs connected to the carry transfer stage. The carry transfer stage comprises first and second active switching devices each comprising first, second and third terminals, the first terminals of the switching devices being connected to receive complementary input carry signals from a preceding carry look ahead circuit, the second terminals being connected together to form a common node and the third terminals being connected to the respective outputs of the logic network, respective load circuits connected to the third terminals for providing symmetrical output carry signals. The logic network comprises n groups of switching devices, where n is an integer of 2 or more, each group comprising first, second and third active switching devices, each switching device having first, second and third terminals, the second terminal of the first switching device and the third terminal of the second switching device being connected to respective outputs of the logic network, the third terminal of the first switching device, the second terminal of the second switching device and the third terminal of the third switching device being connected to an internal node, the second terminal of the third switching device of the first group being connected to said common node, and the second terminal of the third switching device of the second to the nth groups being connected to the internal node of the immediately preceding group. The node in the nth group is coupled to a supply voltage line. Each group of switching devices is responsive to the logical addition of two bits $A_i$, $B_i$ of corresponding significance of two numbers to be added, the logical result $A_i * B_i$ being applied to the first terminal of the first switching device, the logical result $\overline{A_i + B_i}$ being applied to the first terminal of the second switching device and the logical result $A_i \oplus B_i$ being applied to the first terminal of the third switching device.

The logic network is able to supply symmetrical outputs to the carry transfer stage without the necessity of having a second, complementary logic network which is - feature of many known adder circuits. In consequence these are fewer active switching devices than in the known circuits leading to a saving in chip area and current. Furthermore, the symmetrical outputs from the logic stage are such that they form suitable inputs for different implementations of the carry transfer stage, which can be optimized for simplicity of manufacture or for speed of operation.

If desired the active switching devices of the logic network may comprise NMOS transistors.

The first and second active switching devices of the carry transfer stage are connected as a long tailed pair to the common node, which means that the voltage at the common node remains substantially unchanged when there is a reversal of the polarities of the carry signals in the event of the third active switching devices of the logic network being conductive, a change in the polarities of the input carrY signals is reflected substantially simultaneously in the output carry signals without and change taking place in the voltage of the internal nodes, thus saving time and producing a gain in speed.

In one embodiment of the present invention, the first and second active switching devices of the carry transfer stage comprise bipolar transistors connected as a long-tailed pair which enables the stage to operate at the speed of ECL logic which is greater than is the case with another embodiment of the invention in which these switching devices comprise NMOS transistors. However fabrication of an all MOS chip is easier than is the case when bipolar and MOS transistors are provided in the same integrated circuit.

As a compromise between constructional simplicity and speed of operation, a further embodiment of the carry transfer stage is implemented by the load circuits comprising first and second cascoded PMOS and NMOS transistors. The gate electrodes of the NMOS transistors are held at a reference voltage of the order of $1/2\text{VDD}+V_{tn}$, where $V_{tn}$ is the threshold voltage of the NMOS transistor The gate electrodes of the PMOS transistors are cross-coupled. The NMOS transistors function as separation transistors and by holding their gate electrodes at a reference voltage, the voltage swings involved in reversing the polarities of the carry signals are smaller and hence the operation is relatively fast compared to a logic transfer stage not including NMOS separation transistors.

BRIEF DESCRIPTION OF THE DRAWINGS

The present invention will now be described, by way of example, with reference to the accompanying drawings, wherein.

DESCRIPTION OF THE PREFERRED EMBODIMENTS

Figure 1:
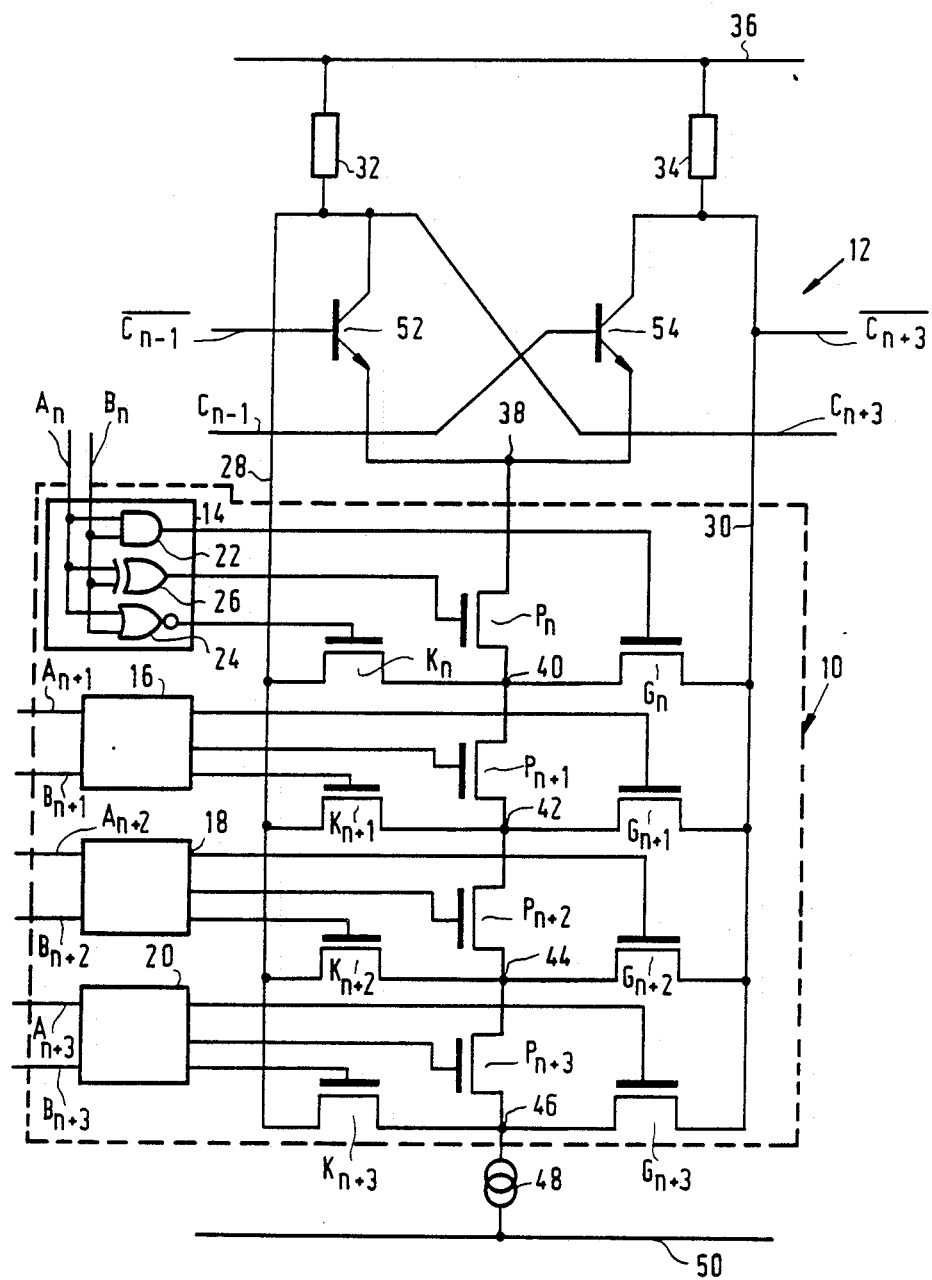
FIG. 1 is a schematic circuit diagram of an embodiment of a carry look ahead circuit comprising a logic network and carry transfer stage.

In the drawings same reference numerals have been used to indicate corresponding the elements.

FIG. 1 illustrates one of a plurality of carry look ahead circuits associated with respective adders for adding together four bits of corresponding significance of two words A and B having a length of say 32 bits. Each carry look ahead circuit may be regarded as comprising two parts. A first part comprises a logic network 10 formed by four half adders connected in series and implemented in NMOS technology. The second part comprises a carry transfer stage 12 implemented in bipolar technology.

Referring to the logic network 10, Pairs of input signals $A_n$ and $B_n$, to $A_{n+3}$ and $B_{n+3}$ are applied to similar logic blocks 14, 16, 18 and 20 each comprising an AND gate 22, a NOR gate 24 and an Exclusive-OR (EX-OR) gate 26. The outputs of the respective AND gates are connected to gate electrodes of carrier "generate" NMOS transistors $G_n$ to $G_{n+3}$. The outputs of the respective NOR gates 24 are connected to gate electrodes of carrier kill. NMOS transistors $K_n$ to $K_{n+3}$. Finally, the outputs of the respective Exclusive-OR gates 26 are connected to the gate electrodes of carrier "propagate" NMOS transistors $P_n$ to $P_{n+3}$.

The source-drain paths of respective pairs of NMOS transistors $G_n$, $K_n$ to $G_{n+3}$, $K_{n+3}$ are connected in series and the four pairs of series connected transistors are connected in parallel between carry logic lines 28,30. These lines 28,30 are coupled to the carry transfer stage 12 in which they are connected by way of respective 2 kOhm load resistors 32, 34 to a supply voltage line 36 at 5 volts. The source-drain paths of the NMOS transistors $P_n$ to $P_{n+3}$ are connected in series. The drain electrode of the transistor $P_n$ is connected to a node 38 in the carry transfer stage 12. The common connections of the source-drain paths of the pairs of transistors $K_n$, $G_n$; $K_{n+1}$, $G_{n+1}$; and $K_{n+2}$, $G_{n+2}$ are connected to respective common connections of the source-drain paths of the pairs of transistors $P_n$, $P_{n+1}$; $P_{n+1}$, $P_{n+2}$; and $P_{n+2}$, $P_{n+3}$ to form internal nodes 40, 42 and 44. The source of the transistor $P_{n+3}$ is connected to the common connection of the source-drain paths of the transistors $K_{n+3}$, $G_{n+3}$ to form an internal node 46. A 200 $\mu$A constant current source 48 is connected between the node 46 and a voltage supply line 50 which is at 0 volt. The logic network 10 of the illustrated circuit has a resemblance to the known Manchester chain circuit but the external connections of the illustrated circuit are different, notably the node 46 is connected via the current source 48 to the line 50 so that there is no rippling through of the carry signal. Also, the network 10 can produce symmetrical logic conditions on the lines 28, 30.

The carry transfer stage 12 comprises NPN transistors 52,54 connected as a long-tailed pair with their emitter electrodes connected to the node 38 The collector electrodes of the transistors 52,54 are connected to respective load resistors 32,34. Carry signals $\overline{C_{n-1}}$ and $C_{n-1}$ from a preceding carry look ahead circuit are applied to the base electrodes of the transistors 52,54, respectively. Carry signals $C_{n+3}$ and $\overline{C_{n+3}}$ for the next higher carrier look ahead circuit are derived from the collector circuits of the transistors 52,54, respectively. The connection of the NPN transistors 52, 54 as a long tailed pair enables the voltage at the node 38 to remain steady irrespective of which of these transistors is conducting However the absolute value of the voltage at the node 38 can vary depending on the logical condition of the half adders. For example, if all of the propagate transistors $P_n$ to $P_{n+3}$ are conductive then the voltage at the node 38 will be $<\text{VDD}-\text{Vj}$, whereas this will not be the case if the voltage on any one of these transistor $P_n$ to $P_{n+3}$ is $>\text{VDD}-\text{Vj}$ causing the transistors 52, 54 to be non-conductive due to lack of current.

In operation the words A and B are applied bit-wise to the respective pairs of inputs of the logic blocks 14 to 20 associated with the respective stages The output of the AND gate 22 will be high if $A_i * B_i = 1$, that of the NOR gate 24 will be high if $\overline{A_i + B_i} = 1$ and that of the EX-OR gate 26 will be high if $A_i \oplus B_i = 1$.

Each carry look ahead circuit has to determine whether the status of the carry signal from a next lower stage has to be changed before it is transferred to the next higher carry look ahead circuit in order to change the status of the carry signal. The conductivity of the NMOS transistors then is altered by the half adders in response to the input signals.

Thus under no signal conditions such as at switch-on, $\overline{C_{n-1}}$ be high and $C_{n-1}$ will be low, the NPN transistors will be non-conductive due to insufficient current, and the transistors $K_n$ to $K_{n+3}$ will be conductive. The collector of the transistor 52 will be low due to the conductivity of the transistors $K_n$ to $K_{n+3}$ while that of the transistor 54 will be high and as a consequence $C_{n+3}$ will be low and $\overline{C_{n+3}}$ will be high.

In the event that all of the transistors $P_n$ to $P_{n+3}$ are conductive, the voltage on the node 38 is $<\text{VDD}-\text{Vj}$ but the conductive/non-conductive condition of the transistors 52, 54 is dependent upon the logical state of the carry signals from the preceding carry look ahead stage. In this situation if the polarities of $C_{n-1}$ and $\overline{C_{n-1}}$ change, the internal nodes 40 to 46 will not change in potential.

In the event that one or more of the propagate transistors $P_n$ to $P_{n+3}$ are non-conductive then the transistors 52, 54 are nonconductive due to lack of current and the value of the carry and $\overline{\text{carry}}$ signals is determined by the transistors $G_n$ to $G_{n+3}$ and $K_n$ to $K_{n+3}$. To illustrate this situation, if the most significant half adder is considered and assuming that $A_{n+3}$ and $B_{n+3}$ have the same value, either both "1"s or both "0"s, then when either the transistor $G_{n+3}$ or $K_{n+3}$ is conductive the other transistor $K_{n+3}$ or $G_{n+3}$ must be non-conductive. When both inputs are "1" then $G_{n+3}$ is conductive causing $\overline{C_{n+3}}$ to be low and $C_{n+3}$ to be high. The converse occurs when both inputs are "0".

As a general rule if one or more of the propagate transistors $P_{n+3}$ to $P_n$ connected to the node 38 is or are conductive so as to form a low impedance path from the node 38, then the output of the carry look ahead circuit is determined by the next lower half adder whose propagate transistor is non-conductive. This can be deduced logically because in order for a propagate transistor to be conductive one of the two inputs to the half adder has to be high. Therefore, if the inputs to the preceding half adder are both "0" then there will be a carry to the next higher carry look ahead circuit. Alternatively, if the inputs to the preceding half adder are both "0") then there will not be a carry to the next higher carry look ahead circuit.

With the circuit arrangement shown in FIG. 1 the propagation of the carry signals is quicker because it is independent of the rippling effect which is an aspect of the known Manchester chain. Also by connecting the half adders of the logic network of the carry look ahead circuit between the node 38 and the current source 48 then changes in the resistance of the circuit due to processing variations, temperature fluctuations and voltage changes have a negligible effect on the operation of the circuit.

The illustrated circuit can be adapted for use with PMOS and PNP transistors but this will include a longer signal processing time compared to using NMOS and NPN transistors.

Figure 2:
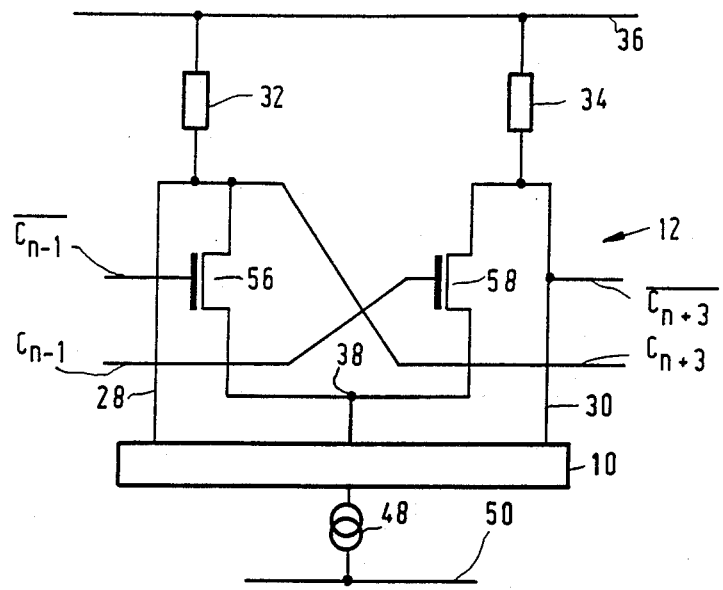
FIG. 2 and 3 illustrate alternative carrY transfer stages suitable for use with the logic network shown in FIG. 1.
Figure 3:
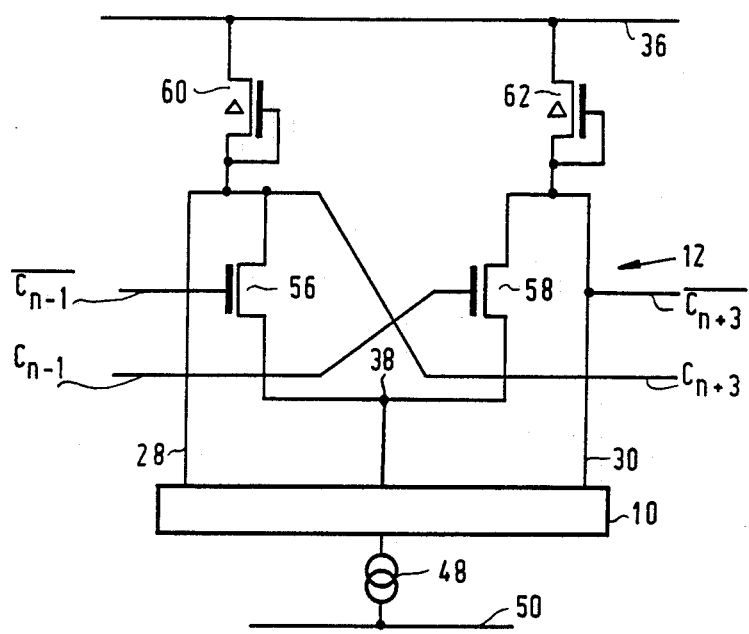

FIGS. 2 and 3 illustrate two variants of the carry transfer stage 12 in which the NPN transistors 52, 54 have been replaced by NMOS transistors 56, 58 connected as a long-tailed pair. Compared to FIG. 1, the illustrated circuits will be slower because, as is well known, CMOS logic is slower than emitter coupled logic.

If desired the fixed resistors 32, 34 in FIGS. 1 and 2 can be implemented as depletion NMOS devices 60, 62 (FIG. 3) having their gate and source electrodes shorted together.

Figure 4:
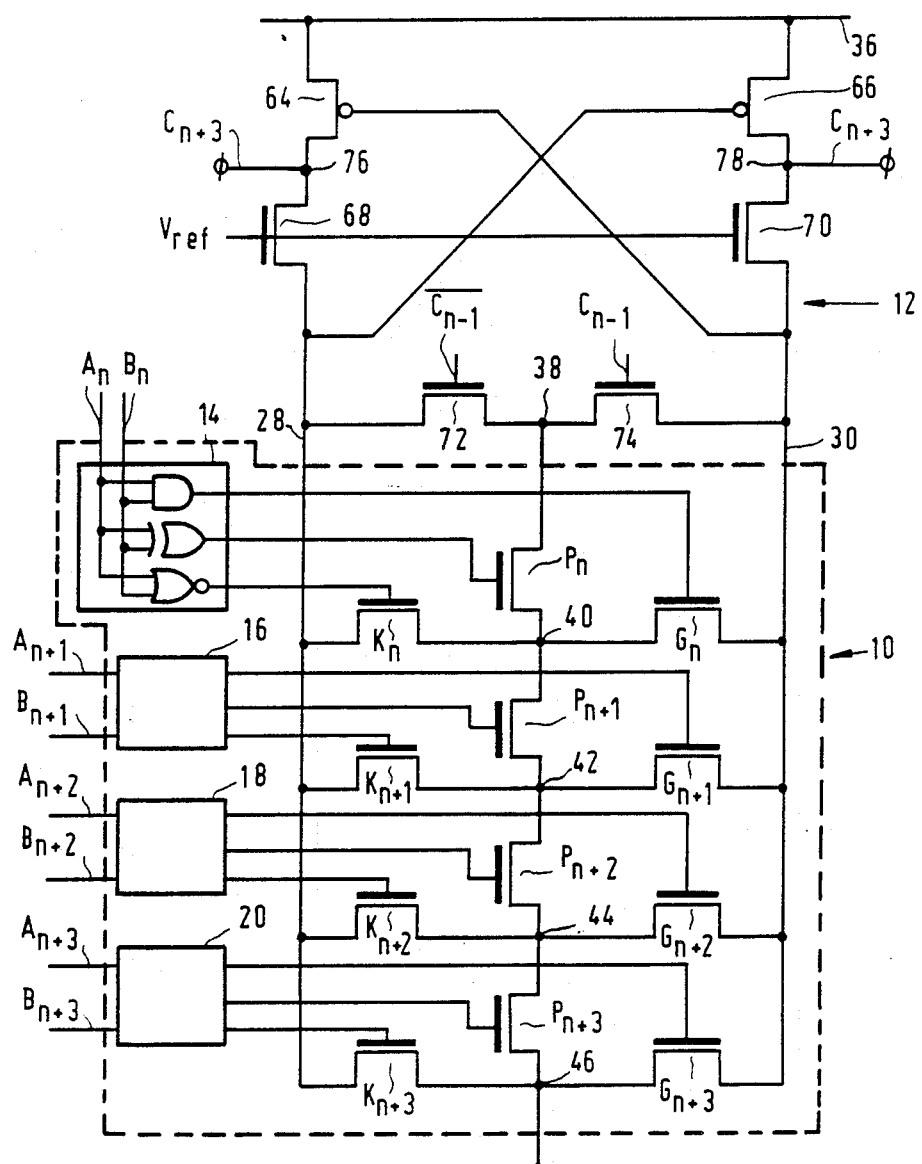
FIG. 4 is a schematic circuit diagram of another embodiment of a carry look ahead circuit employing dynamic split level logic for the carry transfer stage.

FIG. 4 illustrates a carry look ahead circuit using dynamic split level logic in the carry transfer stage 12. Dynamic split level logic is disclosed in European Patent Specification 0149275 A1, which corresponds to U.S. Pat. No. 4,667,303 (5/18/87), and is a method by which the switching speed of a CMOS logic circuit can be increased by reducing the voltage swings involved when the logic states on the lines 28, 30 change symmetrically.

In FIG. 4, the logic network 10 the circuit is the same as is shown in FIG. 1 and accordingly in the interests of brevity it will not be described again. However, it should be noted that the node 46 is connected directly to the voltage supply line 50.

The carry transfer stage 12 comprises PMOS transistors 64, 66 whose source-drain paths are connected in series with the source-drain paths of NMOS transistors 68, 70' respectively. The respective cascoded combinations 64, 68 and 66, 70 are connected between the supply voltage line 36 and the carry logic lines 28, 30, respectively. The gate electrodes of the PMOS transistors 64, 66 are cross-coupled to the lines 30, 28, respectively. The gate electrodes of the NMOS transistors 68, 70, termed the separation transistors in European Patent Specification 0149275 A1, are connected to a reference voltage source (not shown) at $1/2 V_{DD} + V_{tn}$, where $V_{tn}$ is the threshold voltage of an NMOS transistor.

NMOS transistors 72, 74 have their source-drain paths connected in series between the lines 28 30. The junction of the source-drain paths of these transistors 72, 74 constitutes the node 38 to which one end of the source-drain path of the NMOS transistor $P_n$ is connected. Carry signals $\overline{C_{n-1}}$ and $C_{n-1}$ from a preceding carry look ahead circuit (not shown) are applied to the gates of the NMOS transistors 72, 74. The carry outputs $C_{n+3}$, $\overline{C_{n+3}}$ are derived from nodes 76, 78 which are in the common paths of the series connected transistors 64, 68 and 66, 70.

In operation the voltage at the node 38 remains unchanged in the event of a change in the carry $C_{n-1}$, $\overline{C_{n-1}}$ from the preceding carry look ahead circuit and in consequence the outputs remain symmetrical. However the voltage at the node 38 may change depending on the binary value of the bits A, B to be added. For example, if the transistors $P_n$ to $P_{n+3}$ are conductive then the logic condition at the nodes 76, 78 will be the same as the corresponding PHN 12 310 9 signals from the preceding carry look ahead stage in spite of the fact that the node 38 will be at VSS, that is the voltage of the line 50. However any changes in the polarities of $\overline{C_{n-1}}$, $C_{n+3}$ and $C_{n-1}$ will be reflected in the outputs $\overline{C_{n+3}}$ without the internal nodes changing in potential.

If, for example, $\overline{C_{n-1}}$ is high, NMOS transistor 74 is conductive, and $C_{n-1}$ is low, NMOS transistor 72 being non-conductive then the gate-source voltage of the PMOS transistor 64 will be high causing the transistor 64 to be conductive. As the NMOS transistor 68 has a high impedance, then the node 76 will be at a voltage of the order of VDD thus $C_{n+3}$ will be high. Conversely the gate of the PMOS transistor will be at about 2.5 volts causing the transistor to be slightly conductive, the gate-source voltage of the NMOS transistor 70 will be of the order of 3.5 volts rendering the transistor 70 conductive causing the node 78 and thereby $C_{n+3}$ to be low, of the order of 300 mV.

In the event of the line 28 going low and the line 30 going high indicating that there will not be a carry signal to the next carry look ahead stage, then the PMOS transistor 66 will be conductive causing the node 78 to go high making $\overline{C_{n+3}}$ high. The PMOS transistor 64 will be weakly conductive and the NMOS transistor 68 will be conductive causing the node 76 to go low, making $C_{n+3}$ low.

The opposite will happen when the line 30 goes low and the line 28 goes high.

Figure 5:
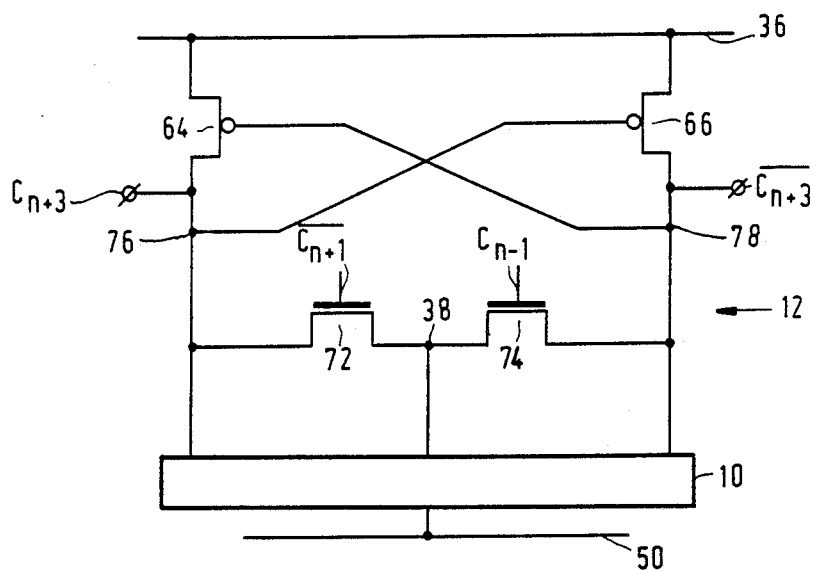
FIG. 5 illustrates a carry transfer stage comprising cross-coupled PMOS transistors

FIG. 5 illustrates a variant of the circuit part 12 relative to that shown in FIG. 4. The difference is that the NMOS separation transistors 68, 70 have been omitted. The practical effect of this is that the voltage swings on the gates of the PMOS transistors 64, 66 will be greater due to the time required for charging and discharging the capacitances at the nodes 76, 78.

Compared to FIG. 5, the provision of the NMOS (separation) transistors 68' 70 in the circuit of FIG. 4 gives the benefits that the voltage sweep on the lines 28, 30 is reduced, that the conducting PMOS transistor 64, 66 prevents a junction with the line 28 or 30 from being recharged because the separation transistor 68 or 70 forms a high impedance, and that the cut-off PMOS transistor 66 or 64 is not entirely in the cut-off condition as a result of which the "off" transistor is in fact "ready" to charge a node 78 or 76 to be charged via the separation transistor 70 or 68.

What is claimed is:

1. A carry look ahead circuit comprising:
   a carry transfer stage; and
   a logic network having symmetrical output nodes connected to the carry transfer stage, the carry transfer stage comprising:
   a first active switching device and a second active switching device, each including a control terminal and a signal path controllable by means of its control terminal and connected between a common node for both switching devices and a respective load, the control terminals being adapted to receive respective mutually complementary input carry signals from a preceding carry look ahead circuit, symmetrical output carry signals being available at carry output nodes located between each load and its respective switching device, said carry output nodes being coupled to respective ones of the output nodes of the logic network;
   the logic network comprising:
   a plurality of groups of further switching devices, each group comprising:
   a third active switching device, a fourth active switching device and a fifth active switching device, each having a control terminal and a signal path controllable by means of its control terminal, means connecting the signal paths of the third and fourth switching devices in series between the output nodes of the logic network, the fifth switching device having its signal path connected to an internal node between the signal paths of the third and fourth switching devices, means connecting the signal paths of the fifth switching devices of the plurality of groups in series between the common node and a supply terminal, each group of further switching devices being responsive to a logical addition of two bits $A_i$, $B_i$ of corresponding significance of two numbers to be added, a logical result $A_i*B_i$ being applied to the control terminal of the third switching device, a logical result $\overline{A_i+B_i}$ being applied to the control terminal of the fourth switching device, and a logical result $A_i \oplus B_i$ being applied to the control terminal of the fifth switching device.

2. A circuit as claimed in claim 1, wherein the further switching devices of the logic network comprise NMOS transistors.

3. A circuit as claimed in claim 1 or 2, wherein the first and second active switching devices of the carry transfer stage comprise bipolar transistors having their emitter electrodes connected to the common node.

4. A circuit as claimed in claim 3, wherein the load circuits are resistive.

5. A circuit as claimed in claim 4, wherein a constant current source is coupled between the series connected signal paths of the fifth active switching devices and said supply terminal.

6. A circuit as claimed in claim 3, wherein a constant current source is coupled between the series connected signal paths of the fifth active switching devices and said supply terminal.

7. A circuit as claimed in claim 1 or 2, wherein the first and second active switching devices each comprise an NMOS transistor having its source electrode connected to the common node.

8. A circuit as claimed in claim 7, wherein the loads each comprise a PMOS-transistor having a conduction channel connected between the respective carry output node and a further supply terminal, the PMOS transistors having their respective control electrodes cross-coupled to the other carry output node.

9. A circuit as claimed in claim 7, wherein each load comprises a cascode arrangement of a PMOS transistor connected to a further supply terminal and a NMOS transistor connected to its respective switching device, means connecting control electrodes of the NMOS transistors to a reference voltage source, control electrodes of the PMOS transistors being cross-coupled to the other switching devices, symmetrical output carry signals being derived from common connections of the PMOS and NMOS transistors.

10. A circuit as claimed in claim 7, wherein the load circuits are resistive.

* * * * *